United States Patent [19]

Lowe

[11] Patent Number: 4,712,508
[45] Date of Patent: Dec. 15, 1987

[54] LITTER MATERIAL FOR SMALL ANIMALS

[76] Inventor: Henry E. Lowe, 201 N. Edwards St., Cassopolis, Mich. 49031

[21] Appl. No.: 439,034

[22] Filed: Nov. 4, 1982

Related U.S. Application Data

[63] Continuation-in-part of Ser. No. 132,285, Mar. 20, 1980, Pat. No. 4,448,151.

[51] Int. Cl.⁴ .............................................. A01K 1/015
[52] U.S. Cl. ........................................................ 119/1
[58] Field of Search ............................................ 119/1

[56] References Cited

U.S. PATENT DOCUMENTS

| | | | |
|---|---|---|---|
| 3,154,052 | 7/1972 | Sweeney | 119/1 |
| 3,332,397 | 7/1967 | Vanderwall | 119/1 |
| 3,735,734 | 5/1973 | Pierce et al. | 119/1 |
| 3,745,975 | 7/1973 | Prucha | 119/1 |
| 3,886,901 | 6/1975 | Zeitter | 119/1 |
| 3,983,842 | 10/1976 | Marion et al. | 119/1 |
| 4,129,094 | 12/1978 | Stockel | 119/1 |
| 4,296,709 | 10/1981 | Schulein | 119/1 |
| 4,386,579 | 6/1983 | Harsh et al. | 119/1 |

FOREIGN PATENT DOCUMENTS

| | | | |
|---|---|---|---|
| 8203151 | 3/1982 | France | 119/1 |
| 1023162 | 2/1966 | United Kingdom | 119/1 |
| 1533261 | 7/1978 | United Kingdom | 119/1 |

Primary Examiner—Gene Mancene
Assistant Examiner—John Weiss
Attorney, Agent, or Firm—Thomas J. Dodd

[57] ABSTRACT

A package or bed of litter for small animals, having at least two horizontally disposed layers of particulate, liquid absorbent material, the upper layer of which is of relatively coarse particles and contains an odor suppressant therein. The lower layer may have odor suppressant in an amount substantially less than in the upper layer, though normally the lower layer would not contain any substantial amount of odor suppressant material. The litter is normally packaged in an elongated container, with the relatively coarse particulate material on top and the relatively fine particulate material on the bottom. When the litter is to be used, the bottom of the container is opened to permit the discharge of the litter from the container into a box, with the relatively fine material on the bottom and the relatively coarse material containing the odor suppressant on top.

12 Claims, 6 Drawing Figures

LITTER MATERIAL FOR SMALL ANIMALS

This application is a continuation-in-part of pending application Ser. No. 132,285, filed Mar. 20, 1980 now U.S. Pat. No. 4,448,151.

BACKGROUND OF THE INVENTION

One of the most difficult problems encountered in providing and maintaining litter boxes for cats to use indoors is the suppressing of the odor from the cat's waste. Various preparations are sold in small containers which can be used by adding them from time to time to the litter material in the box as the litter material is used by the cat. The practice is not only inconvenient but is also often messy and unpleasant, and it is difficult to obtain distribution of the odor suppressant where it will be most effectively utilized. If the odor suppressant is carefully mixed with the litter to obtain good distribution, the separate suppressant can be effective; however, usually some portions of the litter receive an excessive amount of the suppressant, thus resulting in a waste of the relatively expensive preparation, and other portions receive amounts too small to be effective. Hence, the use of a separate odor suppressant for addition to the litter material in the foregoing manner has not been generally accepted by cat owners. Another practice which has been successful in obtaining the desired suppression of the odor in the litter has been the mixing of the suppressant fully with litter at the time the litter is prepared and packaged for distribution and sale. After using the litter in the box, the cat customarily covers the waste by scraping the litter over the waste, using its paw to move the litter in the close proximity of the waste. Since the cat usually uses the litter only close to the center of the box near the top of the litter, only a small portion of the litter is used by the cat, the litter in the bottom and along the periphery of the box often remaining relatively clean and free of odor-causing waste. Since effective odor suppressants are generally rather expensive, the mixing of the suppressant with the litter before packaging unnecessarily increases the cost of the final material, in that a substantial amount of the litter material is never in contact with the cat's waste and hence performs no appreciable function in suppressing the odor at any time during the use of the litter material.

SUMMARY OF THE INVENTION

An object of the invention is to provide a package of cat box filler material which contains a portion in one end of the container having an odor suppressant mixed therewith and a portion in the other end of the container having little or no odor suppressant therein, and which is vertically elongated and has a discharge opening in the end adjacent the material with little or no odor suppressant.

Another object of the invention is to provide a package of the aforesaid type which is relatively simple to fill, ship and use, and which assists in spreading the material when emptied to obtain the most advantageous use of the portion with the odor suppressant.

A further object of the invention is to provide a package for and method of creating multiple layers of material in a sanitary cat box, in which one of the layers has a relatively large amount of odor suppressant and another layer has relatively little or no odor suppressant, and in which the first layer is most concentrated at the place in the box which is used most often by the cat.

The present invention relates to a package of small animal litter material which has an upper layer in the package of relatively coarse particulate material treated with an odor suppressant, and a lower layer in the package of a relatively fine particulate material either not treated with odor suppressant or treated with a lesser amount of odor suppressant than the upper layer, so that, when the material has been emptied from the bottom of the package into the box, the layer having the greatest amount of the odor suppressant treated material will be on top and in the place where the cat most often uses the material in the box.

DESCRIPTION OF THE PREFERRED EMBODIMENT

Figure 1:
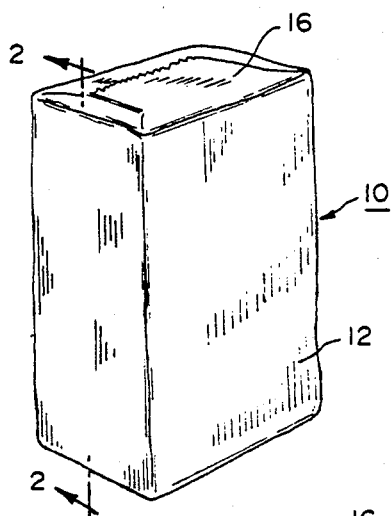
FIG. 1 is a perspective view of a bag of cat box filler material, showing the bag before it has been opened for depositing the filler material therein in the box.
Figure 2:
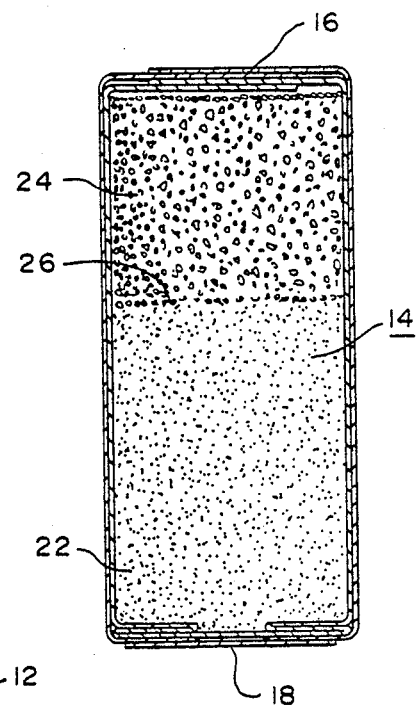
FIG. 2 is a vertical cross sectional view of the bag shown in FIG. 1, the section being taken on line 2—2 of FIG. 1.
Figure 3:
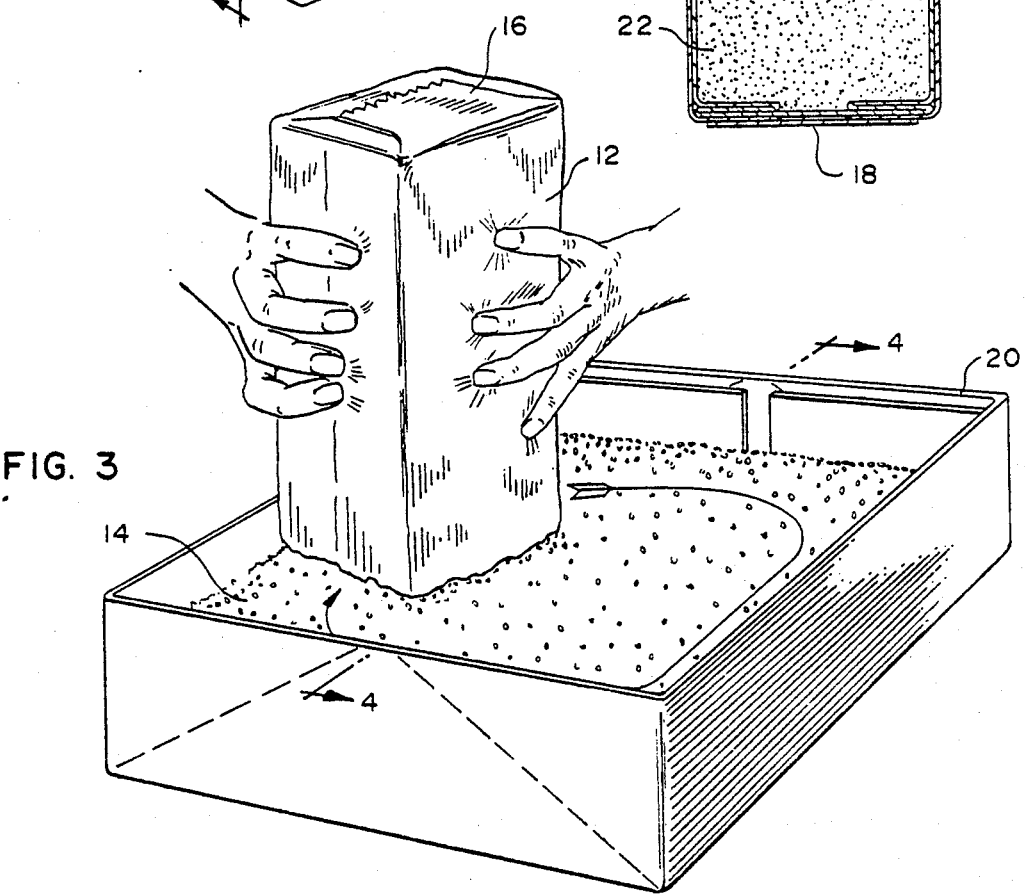
FIG. 3 is a perspective view of a sanitary cat box and the bag of FIGS. 1 and 2, illustrating the manner in which the material is poured from the bottom of the bag to obtain satisfactory distribution of the filler material in the box.

Referring more specifically to the drawings, and to FIGS. 1 and 2 in particular, numeral 10 indicates generally a package of cat box filler material, sometimes referred to as cat litter, consisting of a bag 12 and the cat box filler material indicated generally by numeral 14. Normally the two ends 16 and 18 of the bag are sealed and the lower end, for reasons which will be more fully explained hereinafter, should be relatively easy to open for the purpose of discharging the litter material 14 into a sanitary cat box such as illustrated in FIG. 3 at numeral 20. The package may be a bag or a box, and it may be constructed of either paper, plastic, or a combination of these materials, and it may be flexible or stiff. Normally the bags are of a size which contains 5 or 10 pounds of litter material and can be easily marketed through a supermarket or a hardware or pet store.

The litter material has two distinct layers, namely a lower layer 22 of relatively fine particulate material and an upper layer 24 of a relatively coarse particulate material, with a rather distinct dividing line 26 where the two materials are in contact with one another. The upper layer of relatively coarse particulate material contains or is treated with an odor suppressant, and the lower layer 22 is normally without any odor suppressant, or with only a small amount of odor suppressant. The basic material of layers 22 and 24 may be the same, such as ground clay, the difference between the two layers consisting primarily of the distinct differences in the size of the particles forming the respective layers, and of the presence of an odor suppressant in the layer of relatively coarse particulate material and the absence, or only a small amount, of the suppressant in the relatively fine particulate material. The kind or type of odor suppressant may vary depending upon suitablility of the material for minimizing the odor from the urine and feces deposited by the cat or other animal in the sanitary box.

While the two layers may both contain an odor suppressant, the odor suppressant in layer 24 is normally substantially more potent than the odor suppressant in layer 22. The type of odor suppressant may be different in the two layers and three or more layers of different particle size may be used in the litter material. Since the layer 24 forms the top layer of the filler material after it has been added to the box, and hence acts to prevent the odor from the animal waste from permeating the air above the box, the two layers 22 and 24 are normally not physically separated from one another but merely form a line of contact indicated by numeral 26 as seen in FIG. 2. The size of the particles of the respective layers 22 and 24 is not particularly critical so long as layer 24 is of a coarser texture than layer 22 and is of a size suitable for use by the cat or other animal. Since cats habitually cover the deposited feces, the material should be of such a size that it can easily be moved by the cat's paw to perform the covering operation. Thus a wide range of particle sizes in the two layers is possible so long as the relationship in the particulate sizes is maintained, i.e. a relatively coarse particulate material in layer 24 and a relatively fine layer of particulate material in layer 22, the size normally for layer 24 being larger than a mesh size of 8, usually between 8 and 60, and the size normally for layer 22 being smaller than a mesh size of 8, usually between 6 and 8. The coarse material may constitute as much as 85 percent by weight of the litter material although it is usually less, such as in a range of 40 to 60 percent.

Figure 4:
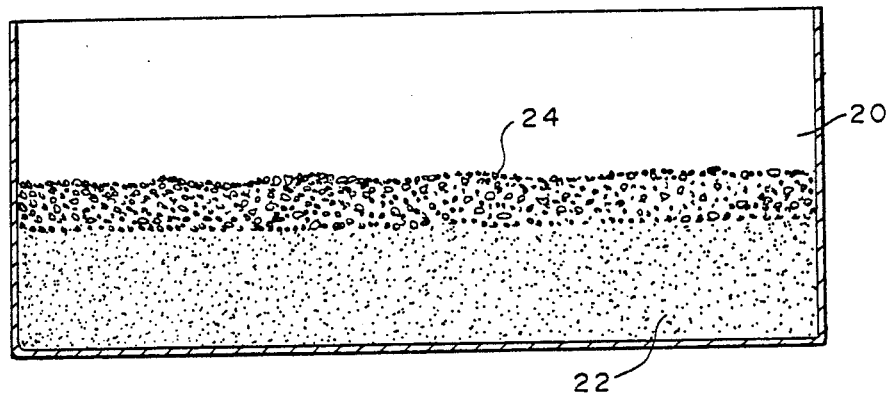
FIG. 4 is a vertical cross sectional view of the cat box shown in FIG. 3, after the material has been deposited therein.
Figures 5, 6:
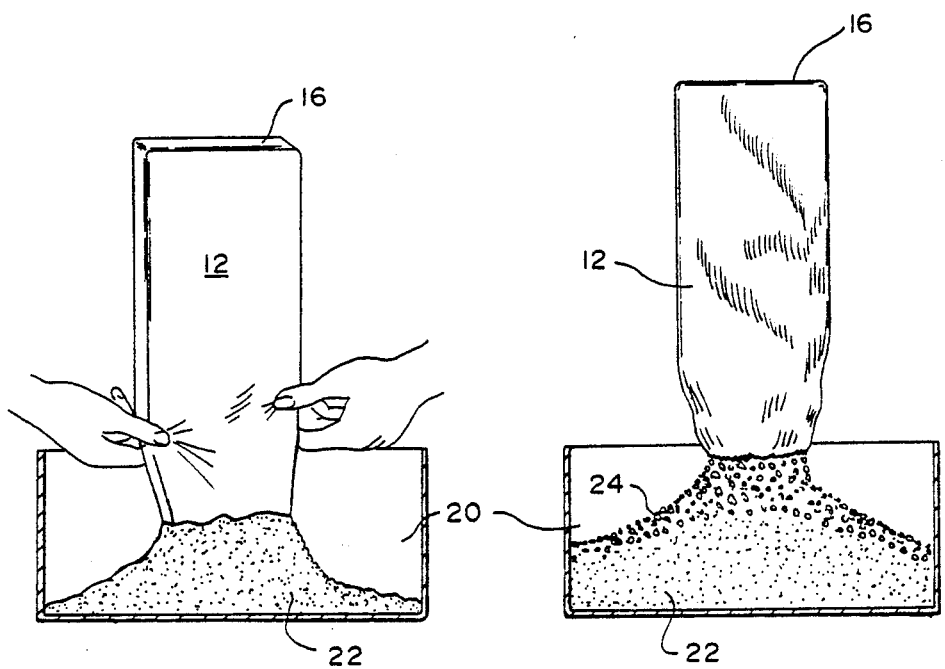
FIG. 5 is a vertical cross sectional view of the cat box shown in the preceding figures and an elevational view of the bag with the filler material being poured from the bag into the box during the initial stage of the filling operation.
FIG. 6 is a vertical cross sectional view of the cat box shown in the preceding figures and an elevational view of the bag, showing the filler material flowing from the bag in a later stage of the cat box filler operation.

The litter material is normally sold in bags which can be conveniently opened from the bottom so that the material can be discharged from the package or container into box 20 wherein the two layers of the bag form two layers as illustrated in FIG. 4. The manner in which the material is removed from the bag and the flow of the material therefrom controlled as it is discharged, is illustrated in FIGS. 5 and 6. After the bottom of the bag has been opened and the material is being discharged, the bag is preferably moved in some type of horizontal movement, such as the circular movement illustrated in FIG. 3, to spread the material and to assist in forming the two distinct horizontal layers as illustrated in FIG. 4, in which the relatively fine particulate material is on the bottom and the relatively coarse material containing the potent odor suppressant is on the top.

The special advantage in the use of a relatively fine and relatively coarse material is that the relatively fine material inherently tends to settle to the bottom of the package or other container, and the relatively coarse material tends to rise to the top. If during the transportation and handling of the package the materials can be two layers become intermingled, the materials can be returned to their original separated condition in the vertically positioned package, with the relatively fine material on the bottom and the relatively coarse material on top, by bouncing or otherwise vibrating the bag in its upright position to effectively separate the material into the two layers with the relatively coarse layer in the top of the package. In order to assist the ultimate user in knowing where the relatively fine and coarse materials are located, the respective layers may be indicated on the external surface of the bag, or a transparent bag or window in the bag may be provided so that the material can be inspected before the bottom of the bag is opened to discharge the material in the box. In order to ensure separation of the large and small particulate material into the respective coarse and fine layers, it may be desirable to perform the bouncing or vibration operation on the package in each instance before it is opened. This normally would require a few jars resulting from bouncing the package while it is in the proper upright position, since the particles of the respective litters will normally not have become intermingled to any significant degree in shipping and handling.

After the material has been placed in the box as illustrated in FIG. 4, the odor suppressant material in the relatively coarse particulate material not only tends to remain on top of the relatively fine particulate material, but the coarse particulate material can be maintained as the effective upper layer by jarring or otherwise vibrating the litter material in the box from time to time between uses of the box by the cat or other animal.

The steps by which the litter material in the package is discharged into the box consist in opening the bottom of the package and permitting the material to flow from the lower end of the package. This operation permits the relatively fine particulate material to cover the lower portion of the box, particularly if the package is moved in a horizontal fashion, such as illustrated in FIG. 3. After the relatively fine particulate material has been discharged, the relatively coarse material flows from the bag, covering the layer of relatively fine particulate material. The material can then be smoothed by hand or otherwise to form a horizontal surface for the animal, and, in the event there has been any mixing of the relatively fine and relatively coarse particulate materials, the box can be jarred or otherwise vibrated to effect suitable separation of the two sizes of particulate material into the respective layers, with the coarse, potent odor suppressant material on top. The special advantages of the present invention are that any inadvertent mingling of the material resulting from unavoidable vibration in transportation and handling can effectively be overcome, and the relatively expensive odor suppressant material can always be maintained in the upper layer of the box, regardless of any undue scratching action performed by the cat or other animals. The box can be jarred or otherwise vibrated to separate the relatively fine and relatively coarse particulate materials from one another into their lower and upper layers as previously described herein.

While only one embodiment of the present cat box filler material has been described in detail herein, various changes and modifications may be made without departing from the scope of the invention.

I claim:

1. A package of litter material for small animals, comprising a container having elongated side walls and opposite end walls, a layer of relatively coarse particulate, liquid absorbent material disposed in one end of said elongated container and having an odor suppressant therein, a layer of relatively fine particulate, liquid absorbent material disposed in the other end of said elongaged container, the end wall adjacent said relatively fine material being openable for discharging sequentially first said relatively fine particulate layer and then said relatively coarse particulate layer to form a multiple layer bed of litter with said relatively coarse particulate material forming the top layer of said bed.

2. A package of litter material for small animals as defined in claim 1 in which said layer of relatively coarse particulate material is disposed in the upper end of the package when the package is in a normal upright position, and the end wall opposite the end in which the coarse particulate material is disposed is openable for discharging the layers of particulate material.

3. A package of litter material for small animals as defined in claim 1 in which said layer of relatively fine particulate material contains an odor suppressant material in material in said coarse particulate material. an amount substantially less than the amount of odor suppressant 4. A package of litter material for small animals as defined in claim 2 in which said layer of relatively coarse particulate material contains an odor suppressant material in an amount substantially greater than the amount of odor suppressant material in said fine particulate material.

5. A package of litter material for small animals as defined in claim 1 in which said relatively fine particulate material is substantially free of odor suppressant material.

6. A package of litter material for small animals as defined in claim 2 in which said relatively fine particulate material is substantially free of odor suppressant material.

7. A package of litter material for small animals as defined in claim 1 in which the particles of the relatively coarse particulate material are in the range of 6 to 8 mesh size and the particles of the relatively fine material are in the range of 8 to 60 mesh size.

8. A package of litter material for small animals as defined in claim 2 in which the particles of the relatively coarse particulate material are in the range of 6 to 8 mesh size and the particles of the relatively fine material are in the range of 8 to 60 mesh.

9. A litter for small animals comprising a bed of litter material having a plurality of horizontally disposed layers of particulate, liquid absorbent material, the upper layer of said particulate material consisting of relatively coarse particles and havig an odor suppressant material therein, and the lower layer consisting of relatively fine particulate material, said layer of relatively coarse particulate material being in close proximity to said fine particulate material and containing said odor suppressant material in an amount substantially greater than the amount of odor suppressant material in said fine particulate material.

10. A litter for small animals as defined in claim 9 in which the particles of said layer of relatively coarse particulate material are larger than a number eight (8) size mesh and the particles of said layer of relatively fine particulate material are smaller than a number eight (8) mesh.

11. A litter for small animals as defined in claim 10 in which the particles of the relatively coarse particulate material are in the range of 6 to 8 mesh size and the particles of the relatively fine material are in the range of 8 to 60 mesh.

12. A litter for small animals as defined in claim 9 in which said layer of relatively fine particulate material is substantially free of odor suppressant material.

* * * * *